United States Patent
Salazar et al.

(10) Patent No.: US 12,524,486 B2
(45) Date of Patent: Jan. 13, 2026

(54) DATA COMPARATOR SYSTEMS AND METHODS

(71) Applicant: United Services Automobile Association (USAA), San Antonio, TX (US)

(72) Inventors: Gabrielle Diane Salazar, San Antonio, TX (US); Dustin Bowen Bitter, Lehi, UT (US); Mitzi Ruiz, San Antonio, TX (US); Jeanie Graciela Lopez, San Antonio, TX (US); Oscar Guerra, San Antonio, TX (US); William Daniel Farmer, Carrollton, TX (US); Jennifer Marie Chandler-Bradley, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 174 days.

(21) Appl. No.: 18/344,424

(22) Filed: Jun. 29, 2023

(65) Prior Publication Data

US 2024/0004943 A1    Jan. 4, 2024

Related U.S. Application Data

(60) Provisional application No. 63/356,759, filed on Jun. 29, 2022.

(51) Int. Cl.
*G06F 16/00*    (2019.01)
*G06F 16/9538*    (2019.01)

(52) U.S. Cl.
CPC .............. *G06F 16/9538* (2019.01)

(58) Field of Classification Search
CPC .... G06F 16/9538; G06F 16/906; G06N 20/00
See application file for complete search history.

(56) References Cited

U.S. PATENT DOCUMENTS

| | | | | |
|---|---|---|---|---|
| 2018/0075018 A1* | 3/2018 | Avkd | ................. | G06Q 10/1053 |
| 2022/0100770 A1* | 3/2022 | Gimple | ................. | G06F 16/256 |
| 2023/0325401 A1* | 10/2023 | Martin | ................. | G06F 16/285 |
| | | | | 707/602 |

* cited by examiner

*Primary Examiner* — Paul Kim
(74) *Attorney, Agent, or Firm* — Fletcher Yoder, P.C.

(57) ABSTRACT

A data correlation and presentation system is provided herein. Machine learning is used to identify correlations in data received from disparate electronic services. Correlated data objects are generated based upon the identified correlations and the correlated data objects are provided in a combined characteristics output, enabling downstream reporting systems to report the correlations with very little processing resource utilization.

18 Claims, 4 Drawing Sheets

TERM COMPARISON

|  | CURRENT | PROPOSED |  |
|---|---|---|---|
| APR: | 3.5% | 4.0% | EXPLAIN |
| PTS: | 1.0 | 1.0 | |
| CLOSING COSTS: | $6500 | $6550 | |
| RESTRICTIONS: | XYZ | | |

DATA COMPARATOR SYSTEMS AND METHODS

CROSS-REFERENCE TO RELATED APPLICATION

The present application claims priority to and the benefit of U.S. Provisional Application No. 63/356,759, entitled "DATA COMPARATOR SYSTEMS AND METHODS" and filed on Jun. 29, 2022, the disclosure of which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statement are to be read in this light, and not as admission of prior art.

Technology increases are allowing for service offerings that are custom tailored to individuals. This custom tailoring provides more custom-desired service offerings, by increasing a number of variables that influence the product offering and/or costs associated with the product offering. Unfortunately, however, this increase in variables among product/service offerings has led to confusion in the marketplace, by making comparisons between products and/services extremely difficult. With product and/or service provides using different variables in their offerings, it becomes very difficult to make an apple-to-apples comparison of product and/or services, especially as variables impacting these products and/or services increase.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein relate to automated data correlation and comparison systems. In particular, systems and methods are provided herein to harness metadata associated with provided data from disparate data sources to identify correlations of the data, enabling presentation of the correlations for graphical comparison of disparate product and/or service offerings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to automated data analytics services. In particular, the present disclosure relates to services that utilize metadata provided with data sources to correlate data across different data sources. The correlated data is provided in a graphical comparison, enabling a more user-friendly comparison of disparate data provided by different data sources.

Figure 1:
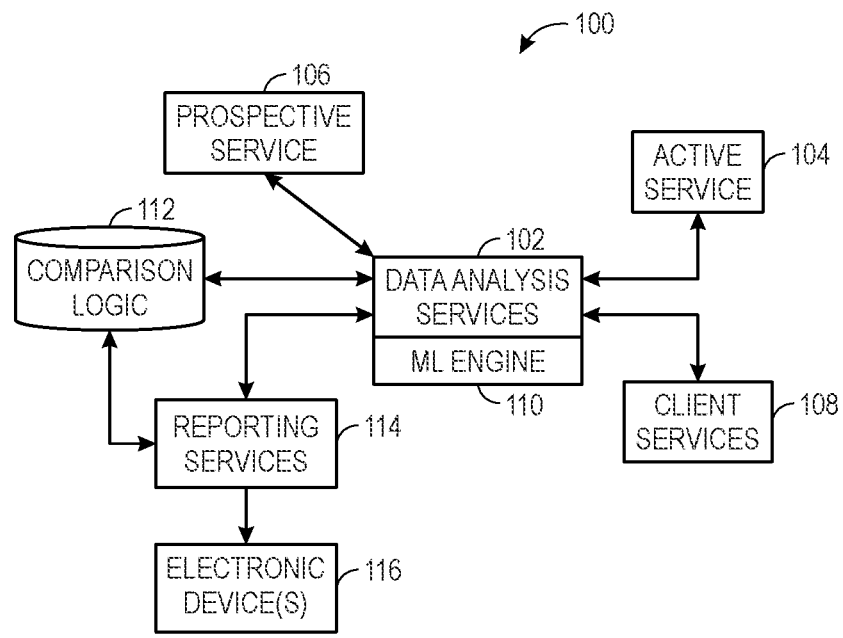
FIG. 1 is a schematic diagram, illustrating a comparator system, in accordance with certain embodiments.

With this in mind, FIG. 1 is a schematic diagram, illustrating a comparator system 100, in accordance with certain embodiments. The comparator system 100 includes a data analysis service 102 that is communicatively coupled with a data source of a first service (e.g., an active service 104) and a second service (e.g., a prospective service 106 maintained by a different entitiy). The active service 104 may include an existing or "active" service of a user, such as electronic banking services that are currently used by a user. The prospective service 106 may include a service that is not currently being used by a user, but may be used in the future (e.g., in lieu of the active service 104). While active service 104 and prospective service 106 will be referenced herein, the described techniques could be used for a host of other services rather than active and prospective services. Accordingly, the use of these terms in describing the current techniques is not intended to limit embodiments exclusively to active and prospective services.

From time to time a user may desire to understand differences in service offerings. For example, a user may desire to understand differences between first services (e.g., active services 104) and second services (e.g., prospective services 106). To obtain an indication of these differences, client services 108 (e.g., which may include a web-service of the second service (e.g., prospective service 106) accessed by a client/user, a web extension executed on a client computer, etc.) may request a data comparison between the first service (e.g., active service 104) and the second service (e.g., prospective service 106).

The data analysis services 102 may access data from the first service (e.g., active service 104) and the second service (e.g., prospective service) and identify correlated data from the two different services. As may be appreciated, because the first and second services are maintained by different entities, the data of the first service (e.g., active service 104) may be quite different than the data of second service (e.g., prospective service 106). Indeed, the data of these services may be provided in different unit measurements, different formats, different data field names, etc. Accordingly, the correlation process of data of the first service to the second service may be quite complex. To solve this correlation problem, the data analysis services 102 may include a machine learning engine 110 that is useful for identifying correlated data between disparate data sources (e.g., different services).

As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task. For example, as illustrated in FIG. 1, comparison logic 112 may be provided as training data to the data analysis services 102 and/or machine learning engine 110. The comparison logic 112 may, in some cases, also include data dictionaries that provide definitions for particular words that may be found in data coming from the first and/or second services. This may help the machine learning engine 110 identify correlations in data coming from these services.

Depending on the inferences to be made, the machine learning engine 110 may implement different forms of machine learning. In some embodiments, a supervised machine learning may be implemented. In supervised machine learning, the mathematical model of a set of transaction data contains both the inputs and the desired outputs. The set of transaction data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. two behaviors from different users) are. It has applications in fraud detection, ranking, recommendation systems, visual identity tracking, face verification, and speaker verification.

Additionally and/or alternatively, in some situations, it may be beneficial for the machine learning engine 110 to utilize unsupervised learning (e.g., when particular output types are not known). Unsupervised learning algorithms take a set of transaction data that contains only inputs, and find structure in the data, like grouping or clustering of transaction data. The algorithms, therefore, learn from test data that has not been labeled, classified or categorized. Instead of responding to feedback, unsupervised learning algorithms identify commonalities in the transaction data and react based on the presence or absence of such commonalities in each new piece of transaction data.

Cluster analysis is the assignment of a set of observations (e.g., transaction datasets) into subsets (called clusters) so that observations within the same cluster are similar according to one or more predesignated criteria, while observations drawn from different clusters are dissimilar. Different clustering techniques make different assumptions on the structure of the transaction data, often defined by some similarity metric and evaluated, for example, by internal compactness, or the similarity between users of the same cluster, and separation, the difference between clusters. Predictions or correlations may be derived by the machine learning engine 110. For example, groupings and/or other classifications of the transaction data may be used to predict correlations between data of the first service (e.g., active service 104) and the second service (e.g., prospective service 106).

An indication of the correlated data may be provided to reporting services 114, which may generate a graphical user interface (GUI) that provides a comparison of data from the first service to the second service based upon the correlations discerned by the data analysis services 102. For example, by identifying corresponding fields of data between the first and second services, a side-by-side comparison of corresponding fields may be generated and provided via the GUI. The GUI may be generated by providing a command, from the reporting services, to render the generated GUI on an electronic device 116, such as an electronic device 116 associated with the request sent from the client services 108. In some embodiments, a user observing the GUI on the electronic device 116 may provide an indication of whether the correlation was correct and/or incorrect via the electronic device 116. In such a case, these indications may be supplied back to the comparison logic 112 and/or the machine learning engine 110 to further improve the machine learning of the data analysis services 102.

Figure 2:
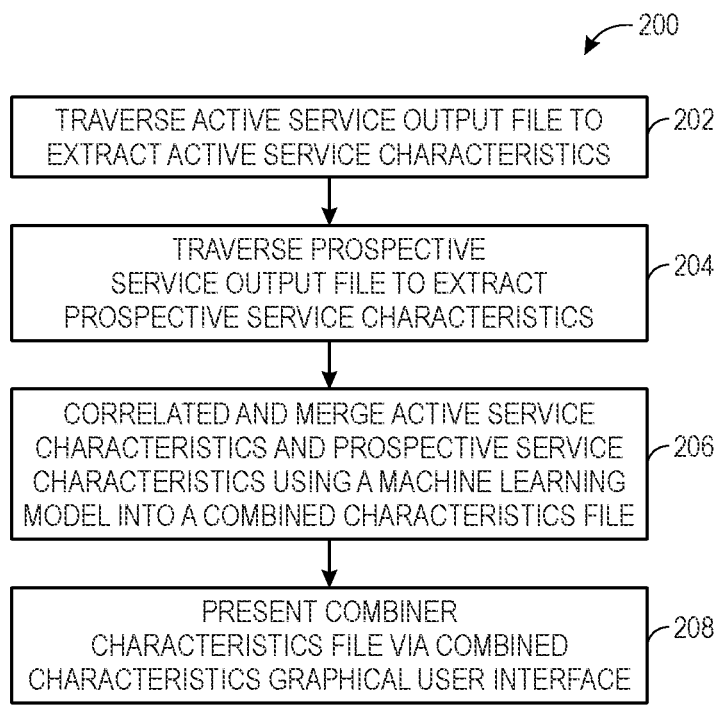
FIG. 2 is a flowchart, illustrating a process for providing a combined comparison presentation, in accordance with certain embodiments.

Turning now to a more detailed description of the data analysis services 102, FIG. 2 is a flowchart, illustrating a process 200 for providing a combined comparison presentation, in accordance with certain embodiments. The process 200 includes traversing a first service output (e.g., an output file and/or output data stream) to extract first service characteristics (block 202). As mentioned above, the first service may be an active service. In some embodiments, each character of the output may be supplied to the machine learning engine 110 of the data analysis services 102, enabling the machine learning engine 110 or other logic of the data analysis services 102 to detect coding/programming nomenclature of the output. The programming nomenclature may be used to identify objects represented in the output, enabling easy traversal of the identified objects, which may represent the characteristics of the first service. The programming nomenclature may be used to delimit portions of the output into logical chunks likely forming an object and/or portion of an object making up a characteristic definition of the service. For example, when the output is a hyper-text markup language (HTML) document, logic of the data analysis service 102 may identify HTML tags that define particular objects within the HTML object (e.g., tags identifying tables, cells, paragraphs, etc.) which may be define the characteristics of the first service.

A similar process is performed on an output received from the second service (block 204). As mentioned above, the second service may be a prospective service. A programming nomenclature of the output of the second service may be identified and used to identify objects within the second service output. The programming nomenclature may be used to delimit portions of the output into logical chunks likely forming an object and/or portion of an object making up a characteristic definition of the service.

To generate the objects useful for the machine learning engine, additional formatting may be provided to extracted content from the output files. For example, an extracted HTML cell may be formatted with container tags that indicate to the machine learning engine 110 that the extracted HTML cell is an object that the machine learning engine 110 should analyze. Further, relational indications, such as indications associating various objects may also be added to the formatting, providing an indication to the machine learning engine 110 of relationships between various supplied objects. For example, if a first HTML cell exists on a common row in the HTML output as another cell, a relationship indication may be provided in the formatting to indicate a likely relationship between the two cell objects. In some embodiments, the machine learning engine 110 may itself discern such relationships using characteristics of the outputs and patterns of known training data. For example, the machine learning engine 110 may discern relationships between objects in the output based upon their relative locations within the output document, particular formatting of the data (e.g., bolding indications (e.g., via an HTML tag), italics indications (e.g., via an HTML tag), etc.

Next, the characteristics of the first service and the second service may be correlated and merged into a combined characteristics file (block 206). As mentioned above, the objects generated from the first service output and the second service output may define characteristics of the first and second services. Despite having different formatted data outputs in the first service and the second service, machine learning may be used to identify correlations between these outputs. For example, one service output may include a cell with a name called INTRT, representing an interest rate data field. The other service output may include a cell named DATA1, but with a related field with a value of "INTEREST RATE:". The machine learning engine 110 may correlate the first cell and the second cell based upon object data provided to it. For example, it may discern a pattern in the cell name INTRT of the first cell of the first service and the value INTEREST RATE: of the related cell to the second cell of the second service. In this manner, these two cells may be correlated and merged as a correlated object that includes cell data from both the first service and the second service. For example, the correlated object may take the format of:

```
<Correlated Object1>
    <Label > Describing "Interest Rate"> </Label>
    <Service 1 Value> 3.5 </Service 1 Value>
    <Service 2 Value> 4 </Service 2 Value>
</Correlated Object1?
```

As illustrated, the correlated object may include a label indicative of a particular feature the correlated object is believed to be correlated based upon. For example, if the machine learning engine 110 discerns that INTRT and INTEREST RATE: are both likely referring to Interest Rate, this may be provided as the label by the machine learning engine 110. Additionally, the service values are provided for both services in the correlated object. In the current example, the first cell value is 3.5 and the second cell value is 4. As may be appreciated, merging the correlated objects may result in considerable processing savings for the downstream reporting services, as these correlated objects may be provided exclusive of other data with the correlations predefined prior to reporting.

Next, the combined characteristics file is provided for reporting of the combined characteristics (block 208). For example, the combined characteristics file may be provided to downstream reporting services 114, which may render a graphical user interface that presents the correlated objects provided in the combined characteristics file. To do this, the reporting services 114, may traverse the object structure of the combined characteristics file and cause rendering on the electronic device 116 of a presentation of values of each object side-by-side with a graphical label that is defined by the label attribute of the object in the combined characteristics file. Because the processing intensive steps are completed up front by the data analysis services 102, the reporting services 114 may provide correlation indications with relatively few processing resources. This may be especially valuable, as oftentimes the reporting services 114 and/or electronic device 116 are lower-resource devices than the systems running the data analysis services 102.

Figure 3:
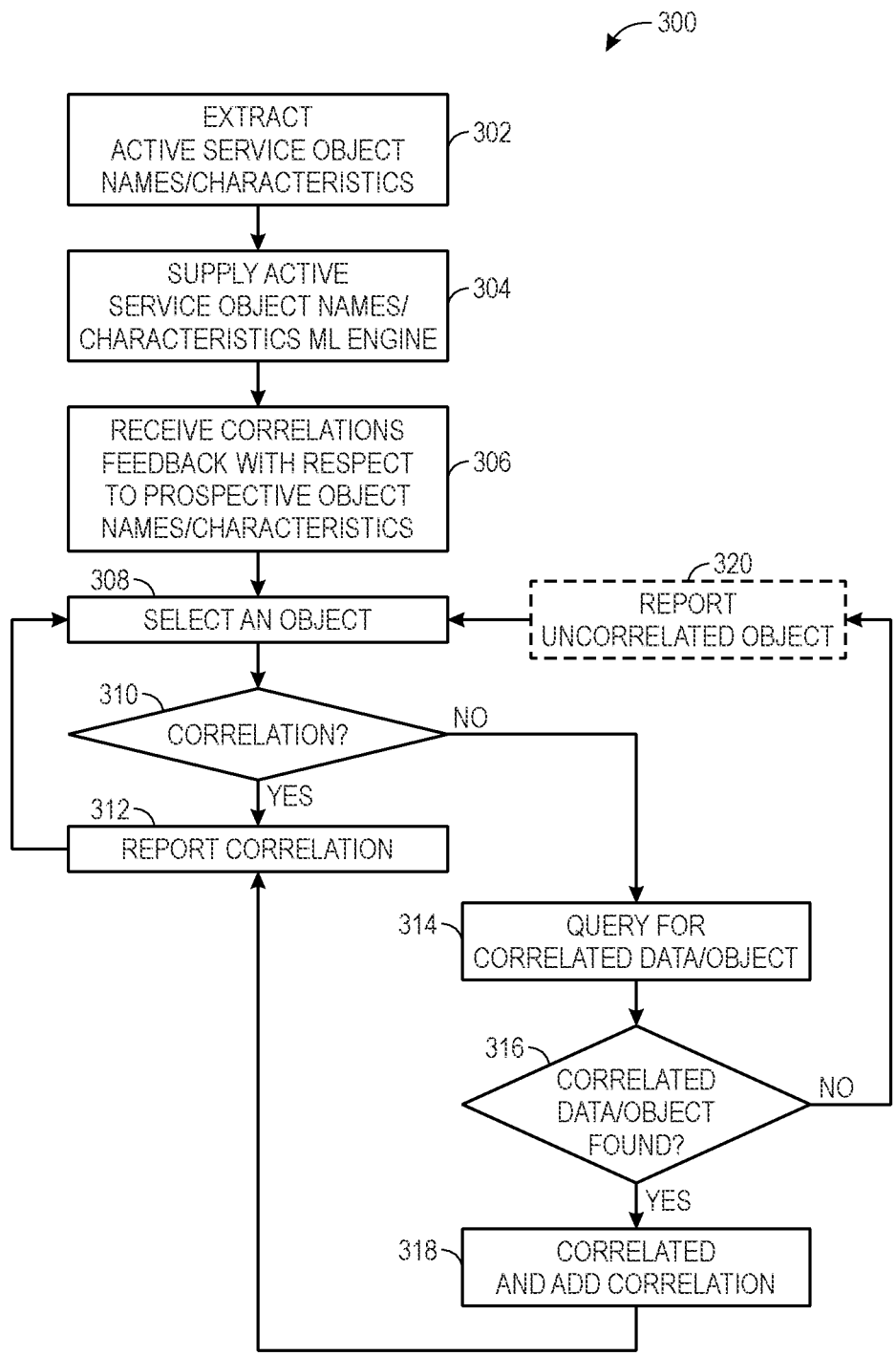
FIG. 3 is a flowchart, illustrating a process for correlating data from disparate data source, in accordance with certain embodiments.

As mentioned above, the correlation of objects may provide significant benefit in comparison presentation between first and second services. FIG. 3 is a flowchart, illustrating a process 300 for correlating data from disparate data sources and reporting the correlations, in accordance with certain embodiments.

The process 300 begins by extracting the object names and/or other characteristics from the first service (block 302). As mentioned above, this may be done by analyzing a nomenclature of the output, identifying how data is described given the identified nomenclature.

The first service object names and/or other characteristics are provided to the machine learning engine 110 (block 304). As mentioned above, the machine learning engine 110 may identify patterns between object names and/or other characteristics of the first service with objects of the second service to find correlations between the data of the two services.

At block 306, correlation feedback is received with respect to correlation between objects of the first service output and the objects of the second service output. As mentioned above, in some embodiments, these correlations may be merged in a merged output that can be used to report the correlations.

After the correlations are determined, starting at block 308, the correlation reporting process is described. This process begins by iteratively selecting objects within the correlation feedback (e.g., the combined characteristics output), starting with a first object in the output (block 308).

In some instances, when a correlation is not found between the first and second outputs, an object may be included that does not have a respective correlation in the other service. Accordingly, at decision block 310, a determination is made as to whether a correlation exists. As may be appreciated, in certain embodiments, this may be performed by identifying whether values for both services are included in the selected object. When only one value exists, no correlation exists. When values for both services exist, a correlation does exist.

If a correlation exists, the correlation is reported (block 312). For example, the correlation may be provided in a graphical user interface (GUI) where a side-by-side presentation of the values of the first system and the second system are displayed. In some embodiments, a label describing the correlation may also be provided. As mentioned above, this label may be specified by the machine learning engine 110 in the correlated object returned by the machine learning engine 110. Processing may then continue by selecting the next object in the correlation feedback (block 308).

If no correlation exists at decision block 310, a subsequent query for correlated data may be performed. When no correlation exists in the second service output for a data object of the first service output, a data query can be performed to identify correlated data at the second service that may have not been included in the second service output. For example, when the first service output includes a data object named INTRT, which may be identified (e.g., using a data dictionary lookup) as relating to "Interest Rate", a bot or other coding mechanism may be executed to automatically query a search engine of the second service for "Interest Rate" data, when "Interest Rate" data is not provided in the second service output.

At decision block 316 a determination is made as to whether correlation data was found via the automated query. Contextual information surrounding any query results of the automated query may be used to identify whether there is enough confidence that the query result data may be correlated with the selected object.

If correlation data is found, the correlation data is correlated with the selected object (block 318). The correlation is then reported (block 312). Processing may then continue by selecting the next object in the correlation feedback (block 308).

However, if no correlation data is found (or the confidence is too low), the selected object may be optionally reported as an uncorrelated object (block 320). For example, a rendering in the GUI may present values for the selected object with a blank value beside the selected object's value, in some embodiments. Processing may then continue by selecting the next object in the correlation feedback (block 308).

Figures 4, 5:
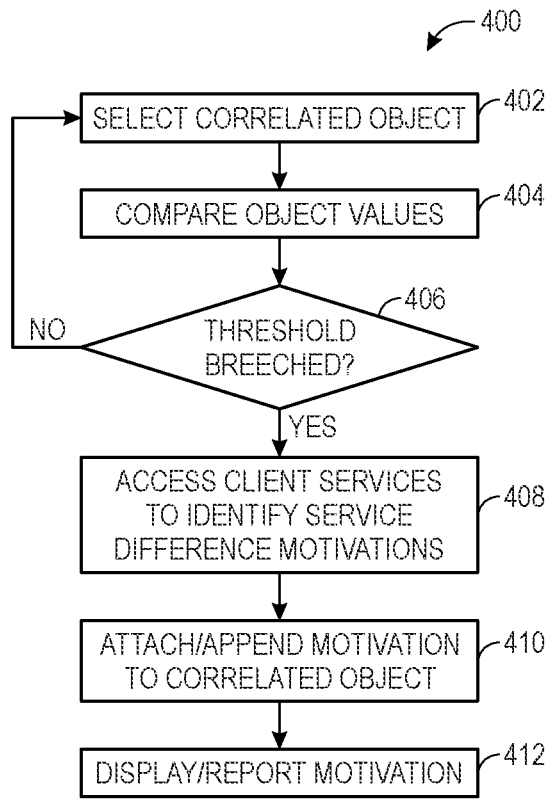
FIG. 4 is a flowchart, illustrating a process for identifying and presenting divergent data motivations, in accordance with certain embodiments.
FIG. 5 is a schematic diagram, illustrating an example of a graphically provided combined comparison presentation, in accordance with certain embodiments.

In some cases, it may be desirable to identify and/or present reasoning and/or motivations for deviations in data from different data services. FIG. 4 is a flowchart, illustrating a process 400 for identifying and presenting divergent data motivations, in accordance with certain embodiments. The process 400 begins with selecting correlated objects (e.g., in the combined characteristics file). As mentioned above, the correlated objects may include multiple values, one or more for each service represented in the correlated object.

These values may be compared with one another (block 404) to determine whether a threshold amount of difference exists between the values (decision block 404). The threshold may be set such that reason/motivation analysis for deviation in values only occurs in situations where a relatively high magnitude of differentiation exists between the values. This may change based upon the type of data the values represent. For example, when discussing a time period, 1 month or 1 year may be a relatively little duration of difference, while more than that amount may be considered a relatively higher duration that would breach a threshold. Other data values could have a different threshold. For example, the threshold for interest rate changes might be a 0.5% difference.

If the differences in values do not result in the threshold being breached, the next correlated object (e.g., in the combined characteristics file) is selected and the analysis continues. If, however, the threshold is breached, client services and/or other services may be accessed to identifier service difference motivations (block 408). For example, broader characteristics of service offering differentiations may be identified, such as geographic region offering disparities, different service vendor characteristics, etc. may be identified, which may explain the differentiation in values between the two services. In some embodiments, data from the service providers (e.g., crawled web-page data) and/or client services 108 (e.g., web-browsing history, etc. indicating particular motivations for differentiation of data values) may be supplied to the machine learning engine 110, which may be tasked with identifying the reason/motivation from the provided data.

After a reason/motivation is identified, it may be appended to the correlated object (block 410). For example, the reason may be added as an attribute to the correlated object in the combined characteristics file. In this manner, the downstream reporting services 114 need only access a specific object to obtain the values and any identified reason for differences in values. The reason motivation may be displayed (block 412) (e.g., with the correlated data values of the plurality of services).

FIG. 5 is a schematic diagram, illustrating an example of a graphically provided combined comparison presentation GUI 500, in accordance with certain embodiments. As illustrated, the GUI 500 may show a column of labels 502 for correlated data (e.g., from a set of correlated objects of a combined characteristics file). Further, the GUI 500 illustrates a column of first data values 504 of a first service and a column of second data values 506 of a second service, disposed side-by-side for easy comparison. In some cases, for example with the "Restrictions" object, there may only be data associated with one of the services. Here, only the first service included data values of "XYZ" while no correlation was found in service 2. Accordingly, service two is shown with an empty field for this row of data. In some embodiments, a characteristic of whether a correlated value is identified across services may be a factor in identifying a reason for differences in values, as described in FIG. 4. For example, here, restrictions existing in service 1 but not existing in service 2, as evidenced by no correlating data value, may indicate a reason for a reduce annual percentage rate (APR), as determined by the machine learning engine 110. The GUI 500 includes an affordance 508 that may dynamically display in association with a row of data (e.g., on the row of data) when a difference in value reaches and/or breaches the difference threshold discussed in process 400 of FIG. 4. Here, the 0.5% difference in APR reaches the 0.5% threshold identified by the system (e.g., either pre-defined and/or identified by the machine learning engine 110 based upon characteristics of the data). Notice that the other rows of data do not include an affordance 508, because these values either do not have corresponding values (e.g., such as in the case of the restrictions data) or the data values for the first and second services are within the defined difference thresholds.

Figure 6:
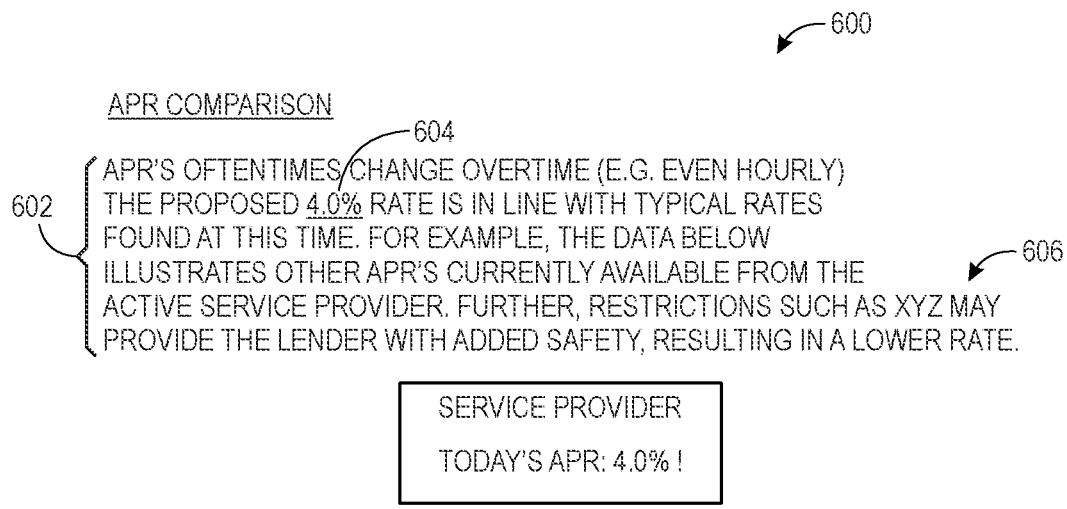
FIG. 6 is a schematic diagram, illustrating a provided detailed motivation associated with data differences between disparate data sources, in accordance with certain embodiments.

Upon selection of the affordance 508, a reason/motivation may be provided. FIG. 6 is a schematic diagram, illustrating a GUI 600 that provides detailed motivation associated with data differences between disparate data sources, in accordance with certain embodiments. The GUI 600 includes a reason/motivation indication 602 that may particularly point out one or more of the values 604 of one of the correlated data values associated with the affordance 508 that was selected (e.g., here the value 4.0% of service 2). Further, when applicable, data value differences identified in the correlated objects that may have impacted the difference threshold meeting difference may also be presented. For example, here, indication 606 indicates the restrictions of service 1 that are not in service 2 may have impacted the difference threshold meeting difference in values of the two services. All of this data may be sourced from the correlated objects in the combined characteristics file, after process 400 is implemented. In this manner, the reporting of correlations and reasons/motivations behind differences in data values between services may be provide with very little processing by the reporting services 114. This may provide efficient resource allocation and exceptionally fast reporting of differences that would not occur if traditional reporting techniques of dynamic report generation by the reporting services 114 were implemented.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium, comprising computer-readable instructions that when executed by one or more processors of one or more computers, cause the one or more computers to:
   receive first output data from a first electronic service;
   receive second output data from a second electronic service, wherein the second output data comprises a different format than the first output data;
   extract first characteristics from the first output data;
   extract second characteristics from the second output data;
   cause machine learning to be performed on the first characteristics and the second characteristics to identify correlated data sets between the first output data and the second output data, each correlated data set of the correlated data sets comprising a first value from the first output data correlated with a second value from the second output data;
   generate a combined characteristics output, by generating and inserting into the combined characteristics output, one or more correlated objects corresponding to the correlated data sets, the one or more correlated objects comprising the first value and the second value of a corresponding correlated data set;
   determine a value difference between the first value and the second value;
   determine whether the value difference meets or breaches a difference threshold;
   when the value difference meets or breaches the difference threshold, query one or more services to identify a reason for the value difference and insert the reason into the combined characteristics output;
   otherwise, when the value difference does not meet or breach the difference threshold, refrain from querying the one or more services to identify the reason for the value difference;
   and
   cause reporting of the correlated data sets, by supplying the combined characteristics output to a downstream reporting service.

2. The tangible, non-transitory, computer-readable medium of claim 1, comprising computer-readable instructions that when executed by the one or more processors of the one or more computers, cause the one or more computers to:
   identify, via machine learning, a label associated with both the first value and the second value of a particular data set; and
   insert into a correlated object corresponding to the particular data set, the label as an attribute of the correlated object corresponding to the particular data set.

3. The tangible, non-transitory, computer-readable medium of claim 1, comprising computer-readable instructions that when executed by the one or more processors of the one or more computers, cause the one or more computers to:
   identify the correlated data sets using a data value field name in the first output data, the second output data, or both.

4. The tangible, non-transitory, computer-readable medium of claim 1, comprising computer-readable instructions that when executed by the one or more processors of the one or more computers, cause the one or more computers to:
   identify a non-correlated data value in the first output data that does not correlate with a value in the second output data;
   based upon identifying the non-correlated data value, automatically query the second electronic service for second service correlation data to correlate with the non-correlated data value.

5. The tangible, non-transitory, computer-readable medium of claim 4, comprising computer-readable instructions that when executed by the one or more processors of the one or more computers, cause the one or more computers to:
   upon receiving a result to the query, generate and insert a correlated data object comprising the non-correlated data value, the second service correlation data, and an indication of a correlation between the non-correlated data value and the second service correlation data into the combined characteristics output.

6. The tangible, non-transitory, computer-readable medium of claim 4, comprising computer-readable instructions that when executed by the one or more processors of the one or more computers, cause the one or more computers to:

upon the query resulting in no second service correlation data, cause reporting of non-correlation of the non-correlated data value.

7. The tangible, non-transitory, computer-readable medium of claim 6, comprising computer-readable instructions that when executed by the one or more processors of the one or more computers, cause the one or more computers to:
cause reporting of non-correlation of the non-correlated data value, by inserting the non-correlated data value into the combined characteristics output without an indication of correlation of the non-correlated data value.

8. The tangible, non-transitory, computer-readable medium of claim 1, comprising computer-readable instructions that when executed by the one or more processors of the one or more computers, cause the one or more computers to:
determine the difference threshold using machine learning based at least in part upon a type of data associated with the first value and the second value.

9. The tangible, non-transitory, computer-readable medium of claim 1, wherein the reason is based at least in part upon one of the first value and the second value being null.

10. A computer-implemented method, comprising:
receiving first output data from a first electronic service;
receiving second output data from a second electronic service, wherein the second output data comprises a different format than the first output data;
extracting first characteristics from the first output data;
extracting second characteristics from the second output data;
causing machine learning to be performed on the first characteristics and the second characteristics to identify correlated data sets between the first output data and the second output data, each correlated data set of the correlated data sets comprising a first value from the first output data correlated with a second value from the second output data;
generating a combined characteristics output, by generating and inserting into the combined characteristics output, one or more correlated objects corresponding to the correlated data sets, the one or more correlated objects comprising the first value and the second value of a corresponding correlated data set;
determining a value difference between the first value and the second value;
determining whether the value difference meets or breaches a difference threshold;
when the value difference meets or breaches the difference threshold, querying one or more services to identify a reason for the value difference and insert the reason into the combined characteristics output; and
otherwise, when the value difference does not meet or breach the difference threshold, refraining from querying the one or more services to identify the reason for the value difference; and
causing reporting of the correlated data sets, by supplying the combined characteristics output to a downstream reporting service.

11. The computer-implemented method of claim 10, comprising:
identifying, via machine learning, a label associated with both the first value and the second value of a particular data set; and
inserting into a correlated object corresponding to the particular data set, the label as an attribute of the correlated object corresponding to the particular data set.

12. The computer-implemented method of claim 10, comprising:
identifying the correlated data sets using a data value field name in the first output data, the second output data, or both.

13. The computer-implemented method of claim 10, comprising:
identifying a non-correlated data value in the first output data that does not correlate with a value in the second output data;
based upon identifying the non-correlated data value, automatically querying the second electronic service for second service correlation data to correlate with the non-correlated data value.

14. The computer-implemented method of claim 13, comprising:
upon receiving a result to the query, generating and insert a correlated data object comprising the non-correlated data value, the second service correlation data, and an indication of a correlation between the non-correlated data value and the second service correlation data into the combined characteristics output; and
upon the query resulting in no second service correlation data, causing reporting of non-correlation of the non-correlated data value, by inserting the non-correlated data value into the combined characteristics output without an indication of correlation of the non-correlated data value.

15. The computer-implemented method of claim 10, comprising:
wherein the difference threshold using machine learning based at least in part upon a type of data associated with the first value and the second value.

16. The computer-implemented method of claim 10, wherein the reason is based at least in part upon one of the first value and the second value being null.

17. A system, comprising:
a first computer implementing a data analysis service, configured to:
receive first output data from a first electronic service;
receive second output data from a second electronic service, wherein the second output data comprises a different format than the first output data;
extract first characteristics from the first output data;
extract second characteristics from the second output data;
cause machine learning to be performed on the first characteristics and the second characteristics to identify correlated data sets between the first output data and the second output data, each correlated data set of the correlated data sets comprising a first value from the first output data correlated with a second value from the second output data;
generate a combined characteristics output, by generating and inserting into the combined characteristics output, one or more correlated objects corresponding to the correlated data sets, the one or more correlated objects comprising the first value and the second value of a corresponding correlated data set; and
cause reporting of the correlated data sets, by supplying the combined characteristics output to a downstream reporting service;

a second computer implementing a downstream reporting service, configured to:
  receive, from the data analysis service, the correlated data sets;
  provide a graphical user interface (GUI) presenting the first value and the second value of each of the correlated data sets;
  identify when a difference value between the first value and the second value of a particular correlated data set meets or breaches a difference threshold;
  in response to the first value and the second value of the particular correlated data set meeting or breaching the difference threshold, dynamically provide, in the GUI, a selectable affordance associated with the particular correlated data set that, when selected, indicates a request for display of a reason for the difference value; and
  in response to selection of the selectable affordance, provide, in the GUI, a graphical indication of the reason for the difference value.

18. The system of claim 17, wherein the first computer implementing the data analysis service is configured to identify the reason for the difference value via machine learning and is configured to provide the reason in the combined characteristics output, by associating the reason with the particular data set.

* * * * *